United States Patent
Hsu et al.

(10) Patent No.: US 8,810,719 B2
(45) Date of Patent: Aug. 19, 2014

(54) ELECTRONIC APPARATUS HAVING CAMERA SENSING CIRCUIT AND OBJECT SENSING CIRCUIT USED FOR SWITCHING BETWEEN TWO DIFFERENT OPERATION MODES AND RELATED COMPUTER-READABLE MEDIUM

(71) Applicant: PixArt Imaging Inc., Hsin-Chu (TW)

(72) Inventors: En-Feng Hsu, Hsin-Chu (TW); Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 97 days.

(21) Appl. No.: 13/651,463

(22) Filed: Oct. 14, 2012

(65) Prior Publication Data

US 2013/0222611 A1    Aug. 29, 2013

(30) Foreign Application Priority Data

Feb. 23, 2012  (TW) .............................. 101105987 A

(51) Int. Cl.
*H04N 5/225* (2006.01)
*H04N 5/222* (2006.01)
*G06F 1/00* (2006.01)
*G06F 1/32* (2006.01)
*H04N 5/232* (2006.01)

(52) U.S. Cl.
CPC .......... *H04N 5/23241* (2013.01); *G06F 1/3231* (2013.01)
USPC ........................ 348/372; 348/333.13; 713/323

(58) Field of Classification Search
CPC .......... H04N 5/23293; H04N 5/23241; G06F 1/3231; G06F 1/3215
USPC ........... 348/372, 333.13; 713/323; 340/693.3
See application file for complete search history.

(56) References Cited

U.S. PATENT DOCUMENTS

| | | | | |
|---|---|---|---|---|
| 7,152,172 | B2* | 12/2006 | Tsirkel et al. | 713/323 |
| 7,162,231 | B2* | 1/2007 | Wu | 455/418 |
| 7,921,480 | B2* | 4/2011 | Parsons et al. | 4/313 |
| 8,560,004 | B1* | 10/2013 | Tsvetkov et al. | 455/550.1 |
| 8,599,265 | B2* | 12/2013 | Kim et al. | 348/164 |
| 8,643,771 | B2* | 2/2014 | You | 348/372 |
| 8,723,957 | B2* | 5/2014 | Kim et al. | 348/164 |
| 2009/0207121 | A1* | 8/2009 | Shih et al. | 345/102 |
| 2011/0134251 | A1* | 6/2011 | Kim et al. | 348/164 |
| 2011/0296163 | A1* | 12/2011 | Abernethy et al. | 713/100 |

(Continued)

FOREIGN PATENT DOCUMENTS

JP           2011118740 A    *  6/2011

*Primary Examiner* — John Villecco
(74) *Attorney, Agent, or Firm* — Winston Hsu; Scott Margo

(57) ABSTRACT

An electronic apparatus includes a circuit system, a camera sensing circuit, and an object sensing circuit. The circuit system is utilized for controlling an operation of the electronic apparatus. The camera sensing circuit is coupled to the circuit system and utilized for sensing at least a portion of a portrait of a user. The object sensing circuit is coupled to the circuit system and utilized for sensing whether any object(s) is/are near to the electronic apparatus. The operation of the object sensing circuit is different from the operation of the camera sensing circuit. The camera sensing circuit is used for determining whether to notify the circuit system to switch from a first operation mode to a second operation mode. The object sensing circuit is used for determining whether to notify the circuit system to switch from the second operation mode to the first operation mode.

19 Claims, 11 Drawing Sheets

(56) References Cited

U.S. PATENT DOCUMENTS

| | | | |
|---|---|---|---|
| 2011/0298967 A1* | 12/2011 | Clavin et al. | 348/372 |
| 2012/0057858 A1* | 3/2012 | Kobayashi | 396/439 |
| 2012/0105193 A1* | 5/2012 | Gritti | 340/3.4 |
| 2012/0235790 A1* | 9/2012 | Zhao et al. | 340/5.83 |
| 2012/0287031 A1* | 11/2012 | Valko et al. | 345/156 |
| 2012/0287035 A1* | 11/2012 | Valko et al. | 345/156 |
| 2013/0009875 A1* | 1/2013 | Fry et al. | 345/168 |
| 2013/0063611 A1* | 3/2013 | Papakipos et al. | 348/207.11 |
| 2013/0231161 A1* | 9/2013 | Hsu et al. | 455/566 |
| 2013/0248717 A1* | 9/2013 | Moore et al. | 250/341.8 |
| 2013/0257710 A1* | 10/2013 | Oh et al. | 345/156 |
| 2014/0009383 A1* | 1/2014 | Wang et al. | 345/156 |
| 2014/0025973 A1* | 1/2014 | Schillings et al. | 713/323 |
| 2014/0068306 A1* | 3/2014 | Oh et al. | 713/323 |
| 2014/0075211 A1* | 3/2014 | Kumar et al. | 713/300 |
| 2014/0075226 A1* | 3/2014 | Heo et al. | 713/323 |
| 2014/0075230 A1* | 3/2014 | Suggs et al. | 713/323 |

* cited by examiner

ELECTRONIC APPARATUS HAVING CAMERA SENSING CIRCUIT AND OBJECT SENSING CIRCUIT USED FOR SWITCHING BETWEEN TWO DIFFERENT OPERATION MODES AND RELATED COMPUTER-READABLE MEDIUM

BACKGROUND OF THE INVENTION

1. Field of the Invention

The disclosed embodiments of the present invention relate to a switching mechanism between two different operation modes in an electronic apparatus, and more particularly, to an electronic apparatus which uses a camera sensing technique and an object sensing technique to determine the switching between two different operation modes, and a computer-readable medium which stores a program code used to perform related operations.

2. Description of the Prior Art

Generally speaking, when a user uses or operates a conventional electronic apparatus, the electronic apparatus is operated in a normal mode. However, when the electronic apparatus receives no input from the user for a specific time period, the conventional electronic apparatus determines that the user currently does not operate or use the electronic apparatus, and thus enters a power saving mode from the normal node to reduce power consumption. For instance, if a conventional notebook receives no user input from a keyboard, a mouse or a touch pad for a specific time period, the conventional notebook determines that the user stops using the notebook, and therefore turns off the display of the notebook and logs out from the user account to save power. However, the accuracy of determining the switching timing between operation modes by only referring to the specific time period is low, which fails to satisfy user's actual operation demands. Therefore, there is a need for an innovative mechanism which is capable of effectively and accurately determining if the user is still using the electronic apparatus for deciding the switching between different operation modes.

SUMMARY OF THE INVENTION

Therefore, one objective of the present invention is to provide an electronic apparatus which uses a camera sensing technique and an object sensing technique to determine the switching between two different operation modes, and a related computer-readable medium, to solve the above issues.

According to a first aspect of the present invention, an electronic apparatus is disclosed. The electronic apparatus includes a circuit system, a camera sensing circuit and an object sensing circuit. The circuit system is utilized for controlling an operation of the electronic apparatus. The camera sensing circuit is coupled to the circuit system and utilized for sensing at least a portion of a portrait of a user. And the object sensing circuit is coupled to the circuit system and utilized for sensing whether any object(s) is/are near to the electronic apparatus. The operation of the object sensing circuit is different from the operation of the camera sensing circuit. Wherein the camera sensing circuit is used for determining whether to notify the circuit system to switch from a first operation mode to a second operation mode. The object sensing circuit is used for determining whether to notify the circuit system to switch from the second operation mode to the first operation mode.

According to a second aspect of the present invention, a computer-readable medium coupled to an electronic apparatus having a circuit system is disclosed. The computer-readable medium includes at least a program code stored therein, and following steps are performed when the program code is read and executed: using an image sensing technique to sense at least a portion of a portrait of a user to determine if the circuit system should enter a second operation mode from a first operation mode; and using an object sensing technique to sense objects around the electronic apparatus to determine if the circuit system should enter a first operation mode from a second operation mode; wherein the object sensing technique is different from the image sensing technique.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
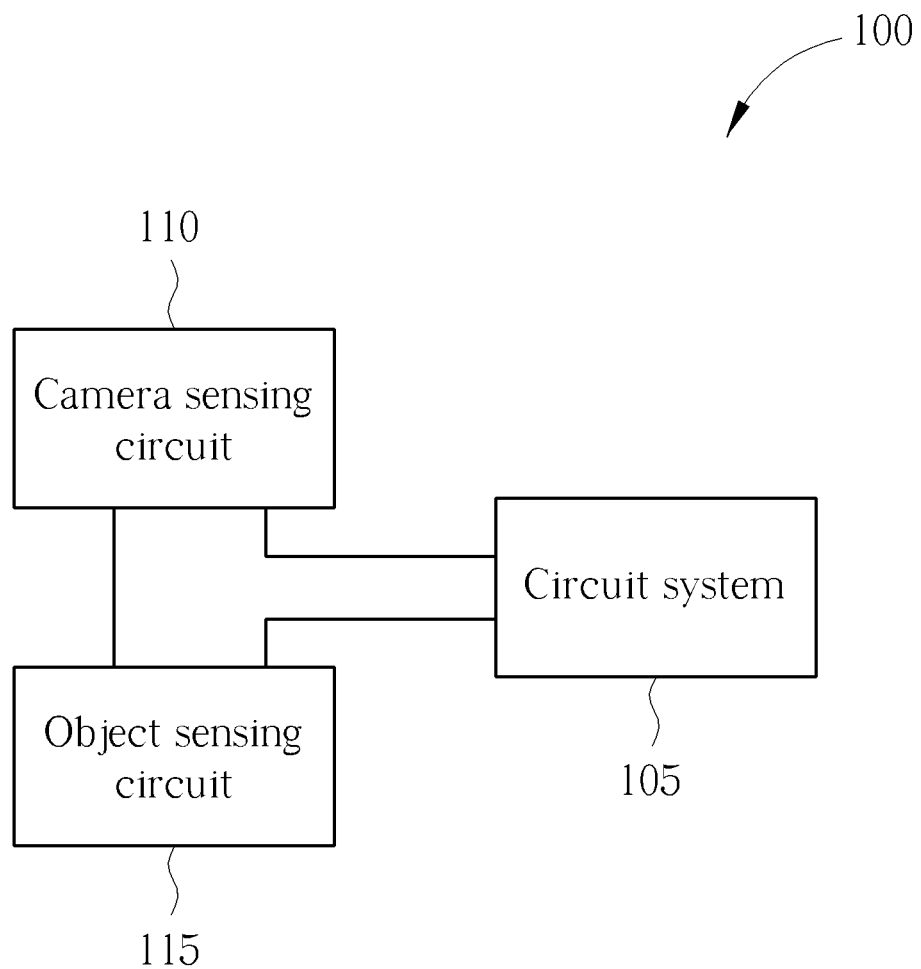
FIG. 1 is a diagram illustrating an electronic apparatus according to an embodiment of the present invention.

Please refer to FIG. 1, which is a diagram illustrating an electronic apparatus 100 according to an embodiment of the present invention. The electronic apparatus 100 includes at least a circuit system 105, a camera sensing circuit 110 and an object sensing circuit 115. The circuit system 105 is utilized for controlling an operation of the electronic apparatus 100. The camera sensing circuit 110 is coupled to the circuit system 105 and utilized for sensing at least a portion of a portrait of a user (i.e., a portion or all). And the object sensing circuit 115 is coupled to the circuit system 105 and utilized for sensing whether any object(s) is/are near to the electronic apparatus 100. The operation of the object sensing circuit 115 is different from the operation of the camera sensing circuit 110. The camera sensing circuit 110 is used for determining whether the circuit system 105 should switch from a first operation mode to a second operation mode. The object sensing circuit 115 is used for determining whether the circuit system 105 should switch from the second operation mode to the first operation mode. In other words, the exemplary embodiment of the present invention uses the image sensing technique employed in the camera sensing circuit 110 to determine whether to exit the first operation mode and enter the second operation mode, and the exemplary embodiment of the present invention also uses the object sensing technique employed in the object sensing circuit 115 to determine whether to switch from the second operation mode to the first operation mode. That is to say, whether the circuit system 105 or other circuit component of the electronic apparatus 100 operates in the first operation mode or not depends on the sensing result generated by the object sensing circuit 115, and whether the circuit system 105 or the other circuit component operates in the second operation mode depends on the sensing result generated by the camera sensing circuit 110. Although the sensing operations performed by the camera sensing circuit 110 and the object sensing circuit 115 respectively are different, the sensing results would not cause contradictions to the determination of the operation mode. In practice, one of the first operation mode and the second operation mode may be set as a primary operation mode, and the other of the first operation mode and the second operation mode may be set as a secondary operation mode. The circuit system 105 or the other circuit components in the electronic apparatus 100 operate mainly in the primary operation mode, and one of the above-mentioned camera sensing circuit 110 and object sensing circuit 115 determines whether the current operation mode should be switched from the primary operation mode to the secondary operation mode when a specific event or condition is triggered. Moreover, the other of the above-mentioned camera sensing circuit 110 and object sensing circuit 115 may determine whether the current operation mode should be switched from the secondary operation mode to the primary operation mode. Therefore, the exemplary embodiment of the electronic apparatus 100 of the present invention employs two different sensing techniques and respective associated circuit components to determine the timing of switching between two different operation modes. Compared with a design using a single technique to determine the timing of switching between two different operation modes, the present invention achieves higher determination accuracy and thus has better system performance.

In this embodiment, the first operation mode is set as a normal mode (i.e., the above-mentioned primary operation mode), the circuit system 105 operates mainly in the normal mode, and the circuit system 105 is arranged to perform a normal operation in the normal mode. It should be noted that the normal operation may be different for different applications. In addition, the secondary operation mode is set as a power saving mode (i.e., the above-mentioned secondary operation mode). The circuit system 105 switches to the power saving mode (the secondary operation mode) from the normal operation mode (the first operation mode) when a specific event or condition is triggered, and then switches to the normal mode from the power saving mode when the specific event or condition ends. When the circuit system 105 is in the power saving mode, the power provided to the circuit system 105 is reduced or partially cut off to make the circuit system 105 enter a power saving status, a sleep status or a standby status for power saving purpose. It should be noted that the circuit system 105 in the embodiments of the present invention may include all or part of the circuit components other than the camera sensing circuit 110 and the object sensing circuit 115 in the electronic apparatus 100. Thus, it means that the power provided to all or part of the circuit components in the electronic apparatus 100 is reduced or cut off when the circuit system 105 enters the power saving mode. Besides, the circuit system 105 operating in the normal mode means that the user is using the electronic apparatus 100 currently, and the electronic apparatus 100 is executing a program operation, a circuit operation or a basic computer/circuit computing operation in response to the user input; and the circuit system 105 operating in the power saving mode means that the user is not using the electronic apparatus 100 currently, and the electronic apparatus 100 enters a power saving status, a sleep status or a standby status.

As mentioned above, the camera sensing circuit 110 is arranged to determine whether the circuit system 105 should enter the power saving mode from the normal mode by sensing the portrait of the user, and the object sensing circuit 115 is arranged to determine whether the circuit system 105 should enter the normal mode from the power saving mode by sensing object(s) around the electronic apparatus 100. In addition, the electronic apparatus 100 (e.g., a notebook, a desktop personal computer (PC), a handheld game console, a smart phone or a tablet PC) is operated by a user. In this embodiment, the electronic apparatus 100 is a notebook. However, this is for illustrative purposes only, and is not meant to be a limitation of the present invention.

Figure 2A:
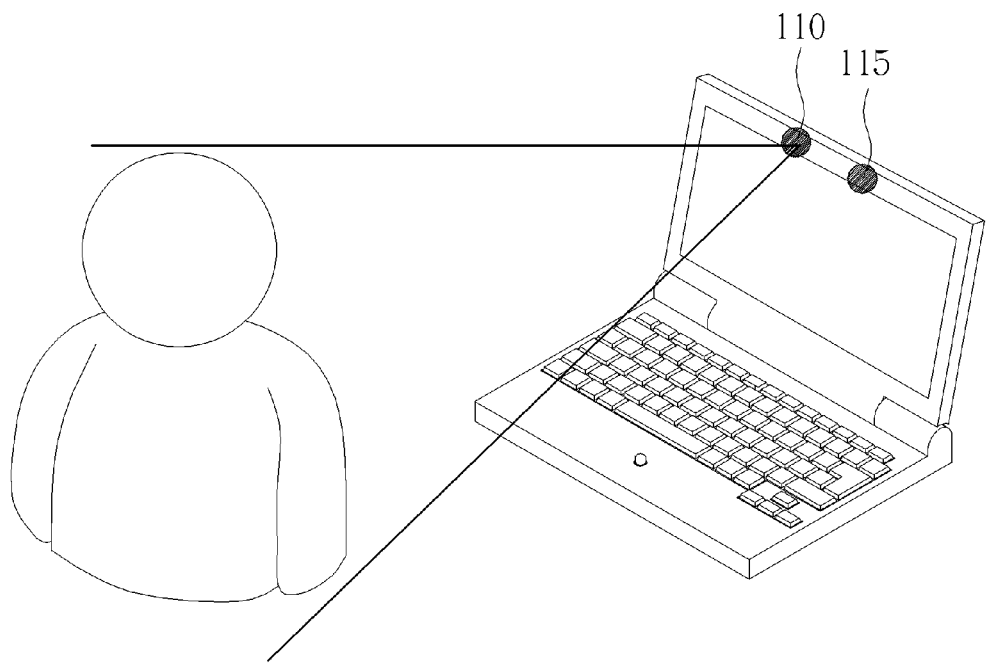
FIG. 2A is a diagram illustrating the operation of the electronic apparatus shown in FIG. 1 in a mode and the related mode switching.

Please refer to FIG. 2A-2E, which are diagrams illustrating the operation of the electronic apparatus 100 shown in FIG. 1 in different modes and the related mode switching operations. As shown in FIG. 2A, the electronic apparatus 100 is a notebook, and the user is in front of the display of the electronic apparatus 100 while using the electronic apparatus 100. At this moment, the circuit system 105 is operating in the normal mode. It should be noted that the area in front of the display is more likely for the user to use the notebook. However, the operation position is not limited to the area in front of the electronic apparatus 100 due to that the electronic apparatus 100 may be employed in other electronic devices like a desktop PC, a handheld game console, a smart phone or a tablet PC. In practice, as different electronic devices may have different operation positions preferred by the user, the operation position which is more likely for a user to operate an electronic device 100 maybe set around the electronic apparatus 100. Besides, in this embodiment, the camera sensing circuit 110 (e.g., a PC camera) is disposed at the upper side of the display of the electronic apparatus 100, and the object sensing circuit 115 (e.g., a proximity sensor) is also disposed at the upper side of the display of the electronic apparatus 100. The camera sensing circuit 110 continuously checks if there is a portrait present in the possible area (e.g., the front region), and utilizes the result as a basis to control the switching of operation modes. Accordingly, the camera sensing circuit 110 can determine whether the user is using the electronic apparatus 100.

Figure 2B:
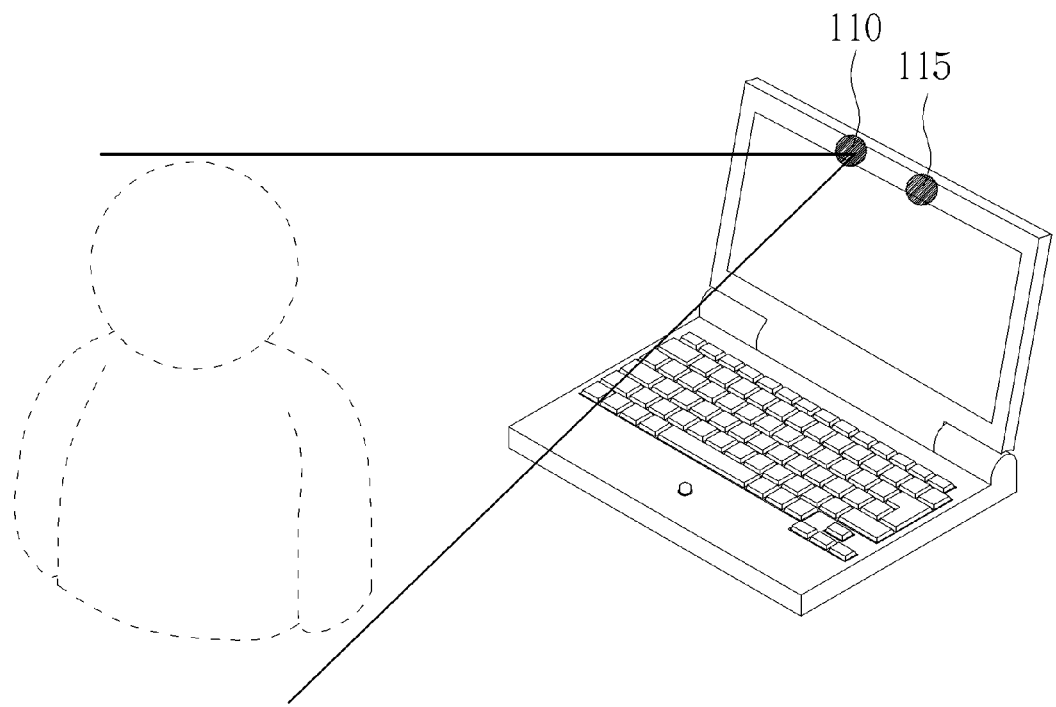
FIG. 2B is a diagram illustrating the operation of the electronic apparatus shown in FIG. 1 in a mode and the related mode switching.

As shown in FIG. 2B, when the user has stopped using the electronic apparatus 100 and has left the electronic apparatus 100 for a period of time, the camera sensing circuit 110 still keeps sensing if the portrait of the user exists according to the image sensing technique. At this moment, the camera sensing circuit 110 finds that there is no portrait of the user in front of the display of the electronic apparatus 100. Hence, the camera sensing circuit 110 determines that the user is not using the electronic apparatus 100 currently. The power would be efficiently saved when the circuit system 105 enters the power saving mode at the time that no one is using the electronic apparatus 100. Thus, the camera sensing circuit 110 decides that the circuit system 105 should exit the normal mode and enter the power saving mode for saving power. At this moment, the camera sensing circuit 110 may generate a signal to notify the circuit system 105 to enter the power saving mode correspondingly, that is to say, the camera sensing circuit 110 is configured to generate a signal to control the circuit system 105 to enter the power saving mode correspondingly. Furthermore, to further reduce the power consumption, in other embodiments, the camera sensing circuit 110 also exits the normal mode and enters the power saving mode after notifying the circuit system 105 to enter the power saving mode. In other words, the power provided to the camera sensing circuit 110 is totally or partially cut off to make the camera sensing circuit 110 enter a power saving status, a sleep status or a standby status. Please note that the operation of totally or partially cutting off the power provided to the camera sensing circuit 110 may be performed at the same time the circuit system 105 is switched into the power saving mode. Besides, controlling the camera sensing circuit 110 to enter the power saving mode from the normal mode may be performed by the circuit system 105 or the logic circuit of the camera sensing circuit 110. Either of the two control manners falls within the scope of the present invention. In addition, the position on the electronic apparatus 100 where the camera sensing circuit 110 and the object sensing circuit 115 are located is not limited to the upper side. In practice, the electronic apparatus 100 has many candidate positions each could be chosen to place the camera sensing circuit 110 and the object sensing circuit 115, and the camera sensing circuit 110 and the object sensing circuit 115 may be disposed at different positions on the same electronic apparatus 100. Alternative designs with various positions of the camera sensing circuit 110 and the object sensing circuit 115 all fall within the scope of the present invention.

Figure 2C:
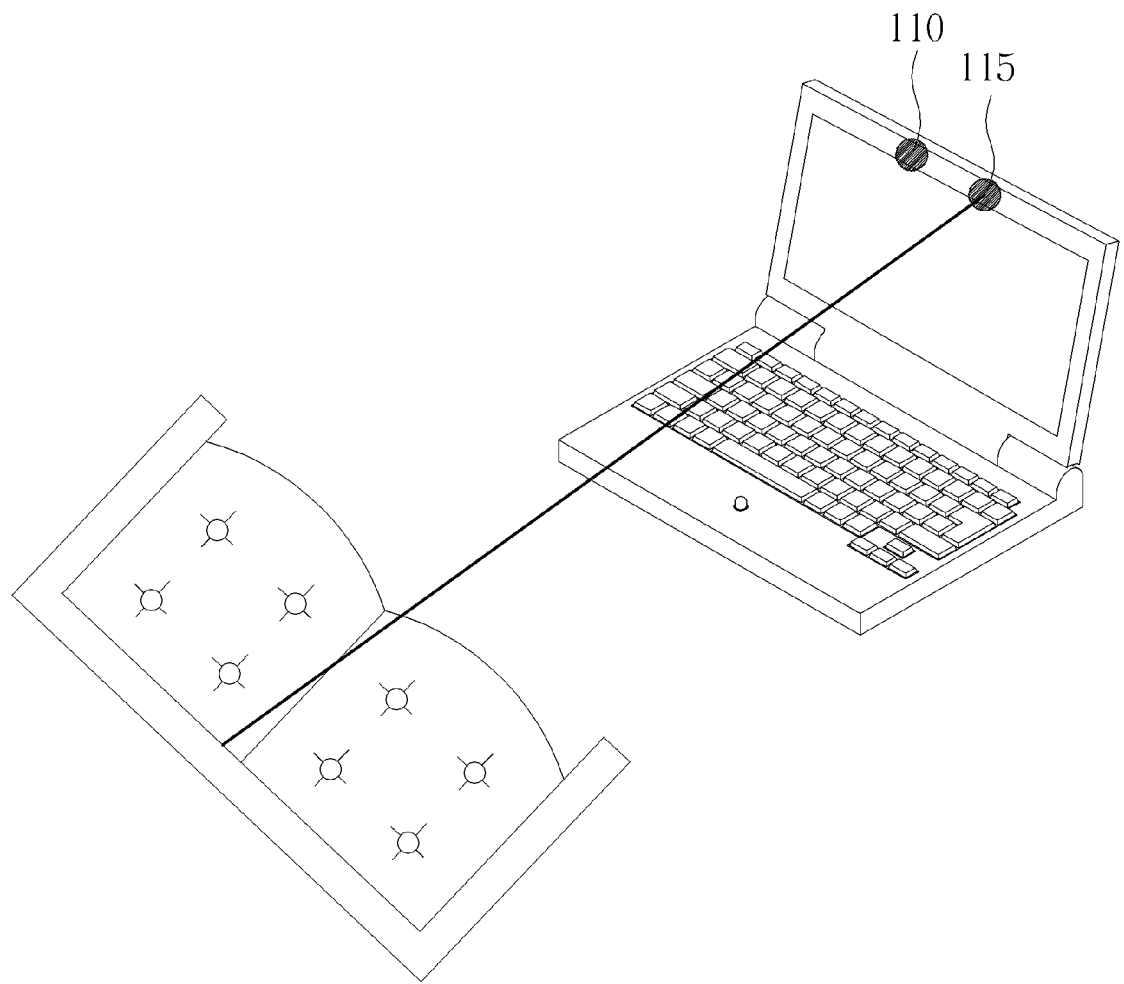
FIG. 2C is a diagram illustrating the operation of the electronic apparatus shown in FIG. 1 in a mode and the related mode switching.

Furthermore, in this embodiment, the object sensing circuit 115 is enabled in the normal mode, and remains the normal operation to monitor the object change around the electronic apparatus 100 when the circuit system 105 enters the power saving mode. For example, the object sensing circuit 115 could determine if a distance between the object and the electronic apparatus 100 is changed by detecting the object distance. In practice, the object sensing circuit 115 could detect the existence of a user by checking if the distance of an interference object in front of the display of the electronic apparatus 100 is changed. As shown in FIG. 2C, when the camera sensing circuit 110 determines that the user is no longer using the electronic apparatus 100, the circuit system 105 is notified to enter the power saving mode due to that the user is not around the electronic apparatus 100 (e.g., in front of the display). At this moment, the object sensing circuit 115 is used to detect the distance of an interference object in front of the display of the electronic apparatus 100 and record the detected distance of the interference object, and then the recoded distance is referenced by the object sensing circuit 115 to determine whether the circuit system 105 or the other circuit components (e.g., the camera sensing circuit 110) of the electronic apparatus 100 should exit the power saving mode and enter the normal mode later.

In addition, the object sensing circuit 115 is utilized to determine whether the circuit system 105 should be switched into the normal mode from the power saving mode. Thus, in other embodiments, the object sensing circuit 115 may be disabled or powered off when the circuit system 105 is operating in the normal mode in order to saving more power. In other words, only when the circuit system 105 is operating in the power saving mode, the objet sensing circuit 115 is enabled or powered on.

Figure 2D:
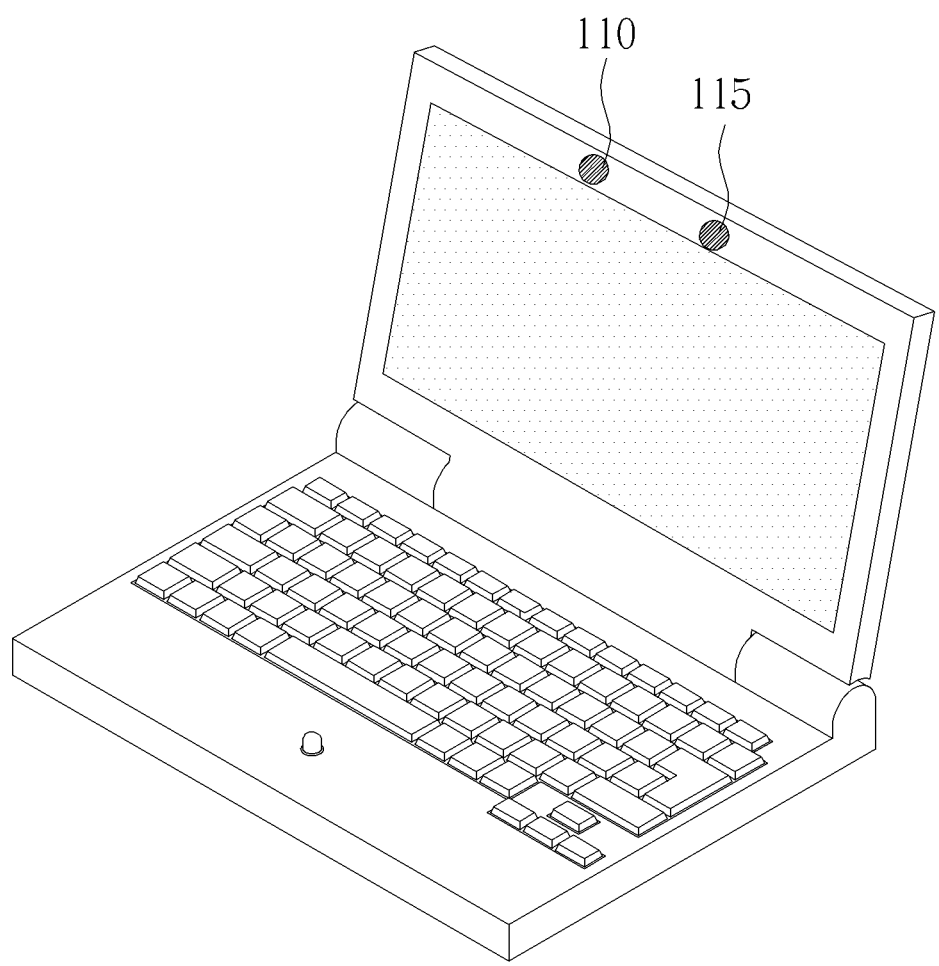
FIG. 2D is a diagram illustrating the operation of the electronic apparatus shown in FIG. 1 in a mode and the related mode switching.

As shown in FIG. 2D, the circuit system 105 is operating in the power saving mode after the object sensing circuit 115 detects the distance of the interference object in front of the display of the electronic apparatus 100. Besides, the display of the electronic apparatus 100 is turned off due to the power saving mode. However, the object sensing circuit 115 stays in the normal mode without entering the power saving mode. Thus, the object sensing circuit 115 keeps detecting the distance of the interference object in front of the display, and records the detection result. Therefore, the object sensing circuit 115 stores a series of distance values of the interference object. The object sensing circuit 115 determines whether the user is close to the electronic apparatus 100 and prepares to start using the electronic apparatus 100 by comparing the distance value of the interference object that is previously recorded at the time the circuit system 105 enters the power saving mode with the distance value of the interference object that is currently recorded at the time the circuit system 105 is still in the power saving mode. If the distance value of the interference object that is previously recorded at the time the circuit system 105 enters the power saving mode substantially equals the distance value of the interference object that is currently recorded at the time the circuit system 105 is still operating in the power saving mode, it means that there is no object change around the electronic apparatus 100. In this condition, the object sensing circuit 115 determines that the user is not moving to the vicinity of the electronic apparatus 100, and therefore determines that the user is not ready to start using the electronic apparatus 100. Hence, the object sensing circuit 115 would not notify the circuit system 105 to switch to the normal mode from the power saving mode, that is to say, the object sensing circuit 115 would not wake up the circuit system 105 at this moment.

Figure 2E:
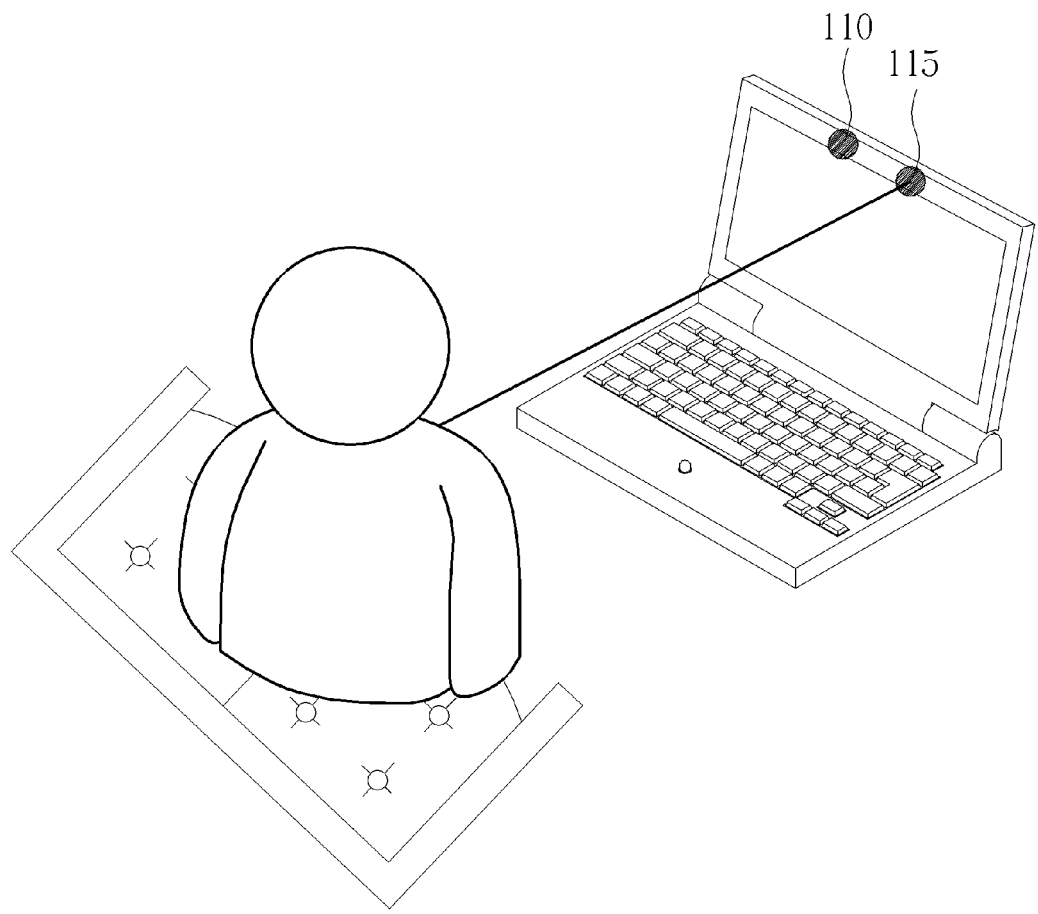
FIG. 2E is a diagram illustrating the operation of the electronic apparatus shown in FIG. 1 in a mode and the related mode switching.

On the contrary, if the distance value of the interference object that is previously recorded at the time the circuit system 105 enters the power saving mode is substantially different from the distance value of the interference object that is currently recorded at the time the circuit system 105 is still operating the power saving mode, it means that the user may move to the vicinity of the electronic apparatus 100. In this condition, the object sensing circuit 115 determines that the user moves to the vicinity of the electronic apparatus 100 and prepares to start using the electronic apparatus 100. Therefore, the object sensing circuit 115 would notify the circuit system 105 to switch to the normal mode from the power saving mode, that is to say, the object sensing circuit 115 would wake up the circuit system 105 at this moment. As shown in FIG. 2E, the distance of the interference object detected by the object sensing circuit 115 becomes shorter due to the user in the vicinity of the electronic apparatus 100. At this time, the distance value of the interference object that is previously recorded at the time the circuit system 105 enters the power saving mode is unequal to the distance value of the interference object that is currently recorded at the time the circuit system 105 is still in the power saving mode. Therefore, the object sensing circuit 115 determines that the user moves to the vicinity of the electronic apparatus 100 and is ready to use the electronic apparatus 100. The display of the electronic apparatus 100 would be turned on again when the object sensing circuit 115 wakes up the circuit system 105.

Figure 3:
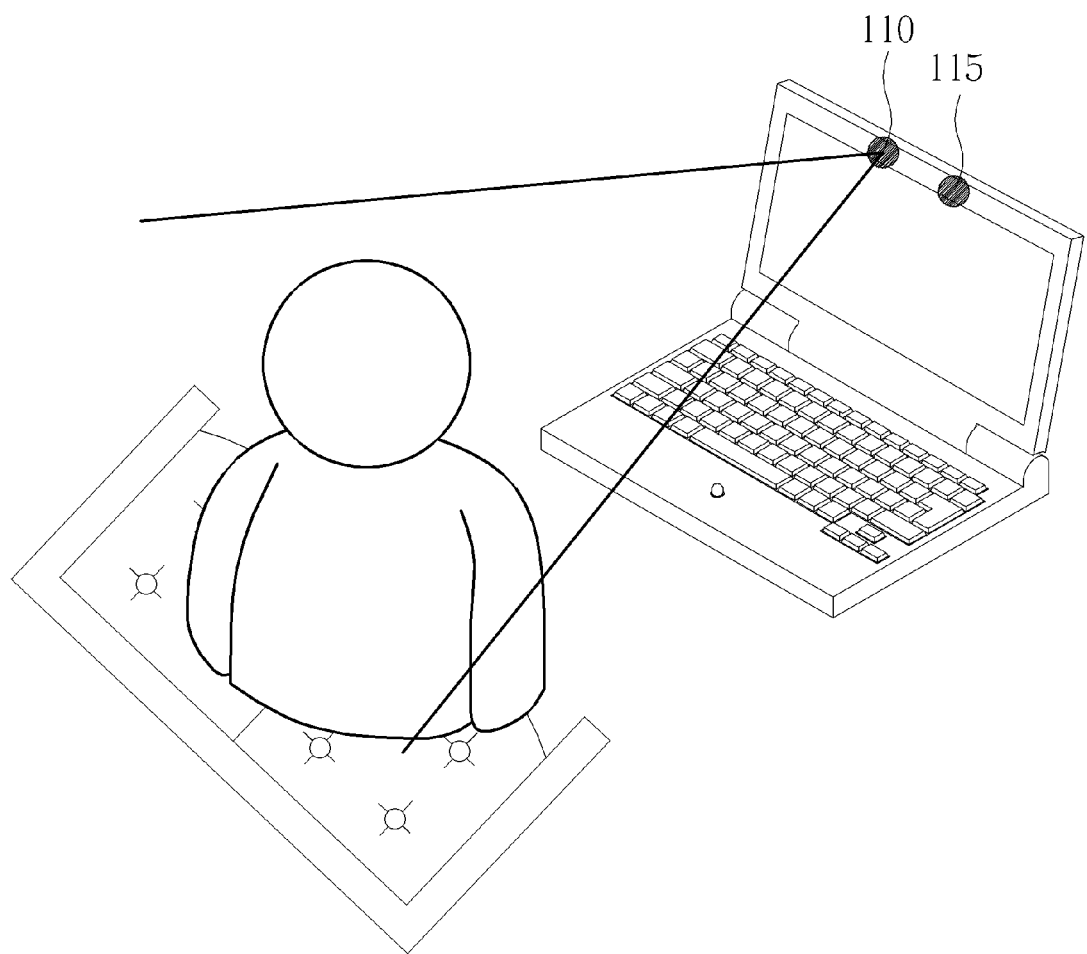
FIG. 3 is a diagram illustrating the electronic apparatus shown in FIG. 1 according to another embodiment of the present invention.

In the above embodiments, only the object sensing circuit 115 is used to perform the object sensing around the electronic apparatus 100 to determine if the user is intending to use the electronic apparatus 100, and the determination accuracy of only using the object sensing circuit 115 to perform above determination operation satisfies the minimum requirement. However, the determination accuracy could be further improved if the camera sensing circuit 110 which uses a different sensing technique collaborates with the object sensing circuit 115. Please refer to FIG. 3, which is a diagram illustrating the electronic apparatus 100 shown in FIG. 1 according to another embodiment of the present invention. The difference between the embodiment shown in FIG. 3 and the above mentioned embodiment shown in FIGS. 2A-2E is described as below. When the object sensing circuit 115 detects a change of the distance of the interference object in front of the display of the electronic apparatus 100 under the power saving mode, the object sensing circuit 115 would not immediately make a decision that the cause of the changed distance of the interference object must be an approaching user. Instead, the object sensing circuit 115 would only make a preliminary decision that there may be a user approaching the electronic apparatus 100 to cause the distance change of the interference object. In order to determine whether the distance change of the interference object is actually caused by an approaching user, the object sensing circuit 115 would notify the camera sensing circuit 110 to exit the power saving mode and enter the normal mode, that is, the object sensing circuit 115 would wake up the camera sensing circuit 110, and then the camera sensing circuit 110 would sense if there is at least a portion of a portrait of a user in front of the display of the electronic apparatus 100. If there is at least a portion of a portrait of a user detected by the camera sensing circuit 110 as shown in FIG. 3, a conclusion that the detection result of the object sensing circuit 115 is indeed caused by a user approaching the electronic apparatus 100 (i.e., the camera sensing circuit 110 detects at least a portion of a portrait of a user) can be made. The camera sensing circuit 110 or the object sensing circuit 115 would wake up the circuit system 105 at this moment to turn on the display of the electronic apparatus 100. On the contrary, if the camera sensing circuit 110 detects no portrait of a user, it implies that the detection result of the object sensing circuit 115 is not caused by a user approaching the electronic apparatus 100, and the camera sensing circuit 110 would exit the normal mode and enter the power saving mode again. Hence, none of the camera sensing circuit 110 and the object sensing circuit 115 would wake up the circuit system 105, and the display of the electronic apparatus 100 would not be turned on.

Figure 4:
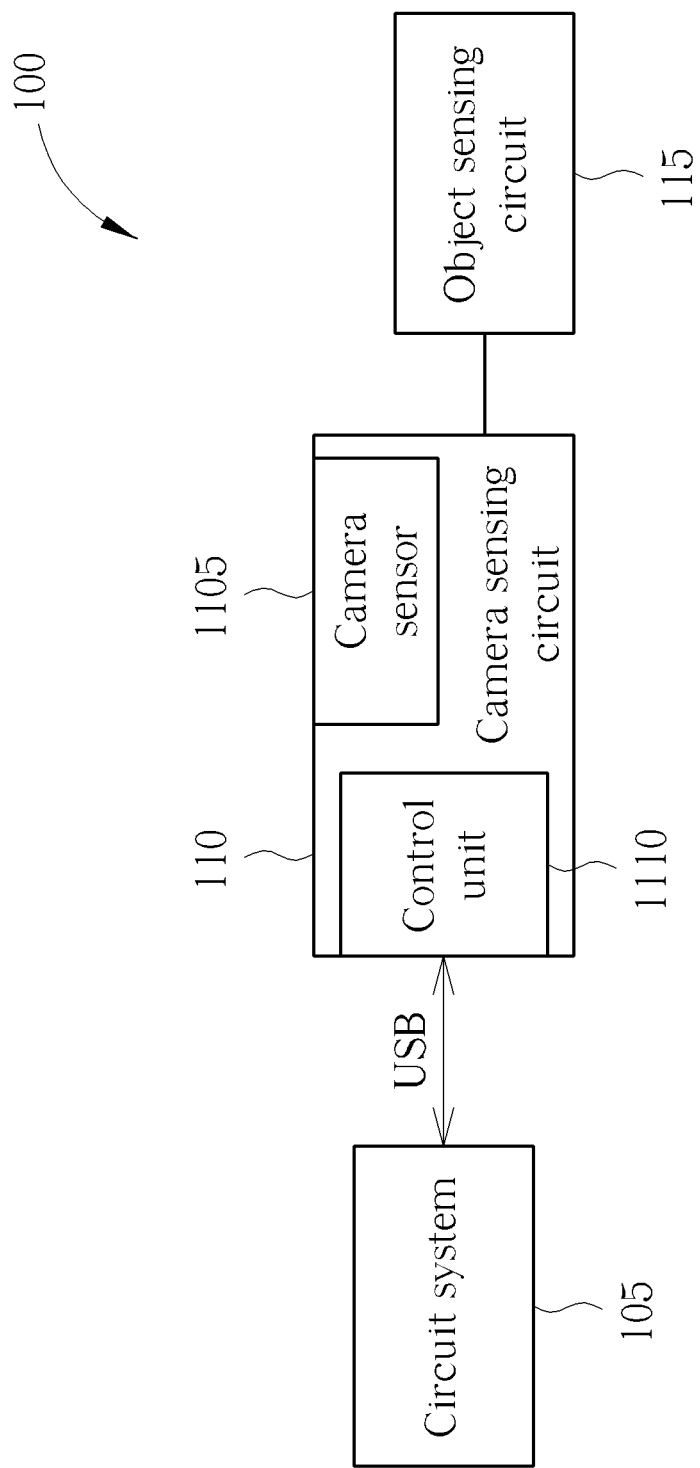
FIG. 4 is a diagram illustrating the electronic apparatus shown in FIG. 1 according to another embodiment of the present invention.

Please refer to FIG. 4, which is a diagram illustrating the electronic apparatus 100 shown in FIG. 1 according to another embodiment of the present invention. As shown in FIG. 4, the camera sensing circuit 110 includes a camera sensor 1105 and a control unit 1110, wherein the camera sensor 1105 is used to sense at least a portion of a portrait of a user, and the control unit 1110 is used to refer to the detection result of the camera sensor 1105 for determining whether to wake up the circuit system 105. The control unit 1110 is electrically connected to the circuit system 105 through a universal serial bus (USB), and the object sensing circuit 115 is electrically connected to the circuit system 105 through the camera sensing circuit 110, that is to say, the camera sensing circuit 110 is coupled between the circuit system 105 and the object sensing circuit 115. Therefore, in this exemplary embodiment, the camera sensing circuit 110 would notify the circuit system 105 through the USB to make the circuit system 105 enter the power saving mode when the camera sensing circuit 110 determines to exit the normal mode and enter the power saving mode. Besides, when the camera sensing circuit 110 determines to exit the normal mode and enter the power saving mode, the camera sensing circuit 110 would also enter the power saving mode from the normal mode such that the circuit system 105 and the camera sensing circuit 110 are in a power saving status, a sleep status or a standby status.

When the object sensing circuit 115 detects that the distance value of the interference object previously recorded at the time the circuit system 105 enters the power saving mode is different from the distance value of the interference object currently recorded at the time the circuit system 105 is till in the power saving mode, the object sensing circuit 115 would determine that the user may move to a user control region of the electronic apparatus 100 (i.e., a change of the distance of an object around the electronic apparatus 100 is detected) and start to use or control the electronic apparatus 100. Therefore, the object sensing circuit 115 would notify the camera sensing circuit 110 to exit the power saving mode and enter the normal mode, that is, the object sensing circuit 115 would wake up the camera sensing circuit 110. After entering the normal mode, the camera sensing circuit 110 would sense if there is at least a portion of a portrait of a user in front of the display of the electronic apparatus 100 (i.e., the camera sensing circuit 110 would perform a portrait determination). If there is at least a portion of a portrait of a user detected by the camera sensing circuit 110, a conclusion that the detection result of the object sensing circuit 115 is indeed caused by a user in the vicinity of the electronic apparatus 100 can be made. At this moment, the camera sensing circuit 110 would wake up the circuit system 105 through the USB. In other words, the object sensing circuit 115 could make the circuit system 105 exit the power saving mode and enter the normal mode through the notification of the camera sensing circuit 110. On the contrary, if the camera sensing circuit 110 detects no portrait of a user, the detection result of the object sensing circuit 115 is not caused by a user approaching the electronic apparatus 100. Hence, the camera sensing circuit 110 would exit the normal mode and enter the power saving mode again, and the camera sensing circuit 110 and the object sensing circuit 115 would not wake up the circuit system 105 or notify the circuit system 105 about the determining result of the user portrait. As a result, the circuit system 105 remains in the power saving mode.

Figure 5:
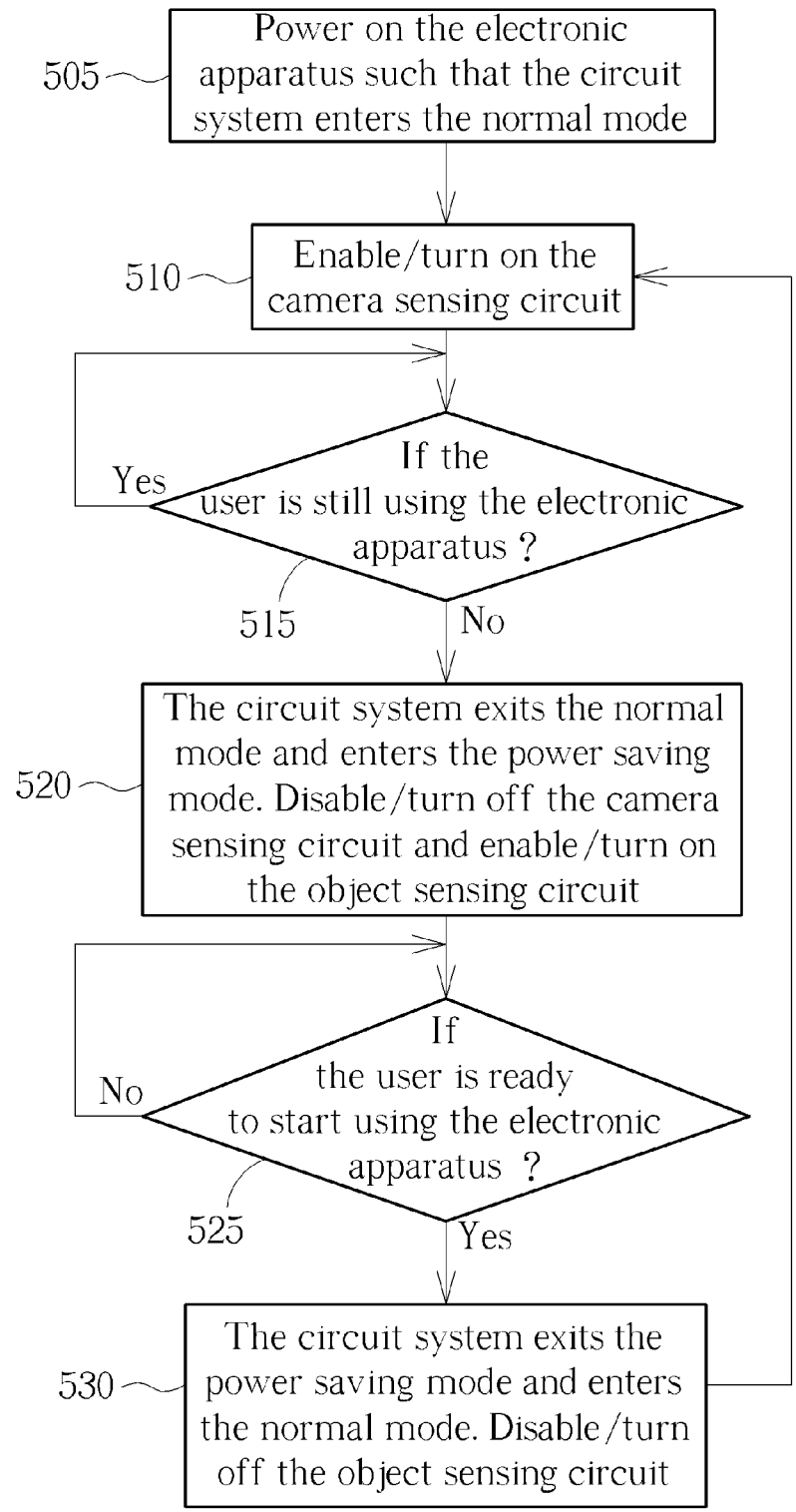
FIG. 5 is a flowchart illustrating the operation of the electronic apparatus shown in FIG. 1 in an embodiment of the present invention.
Figure 6:
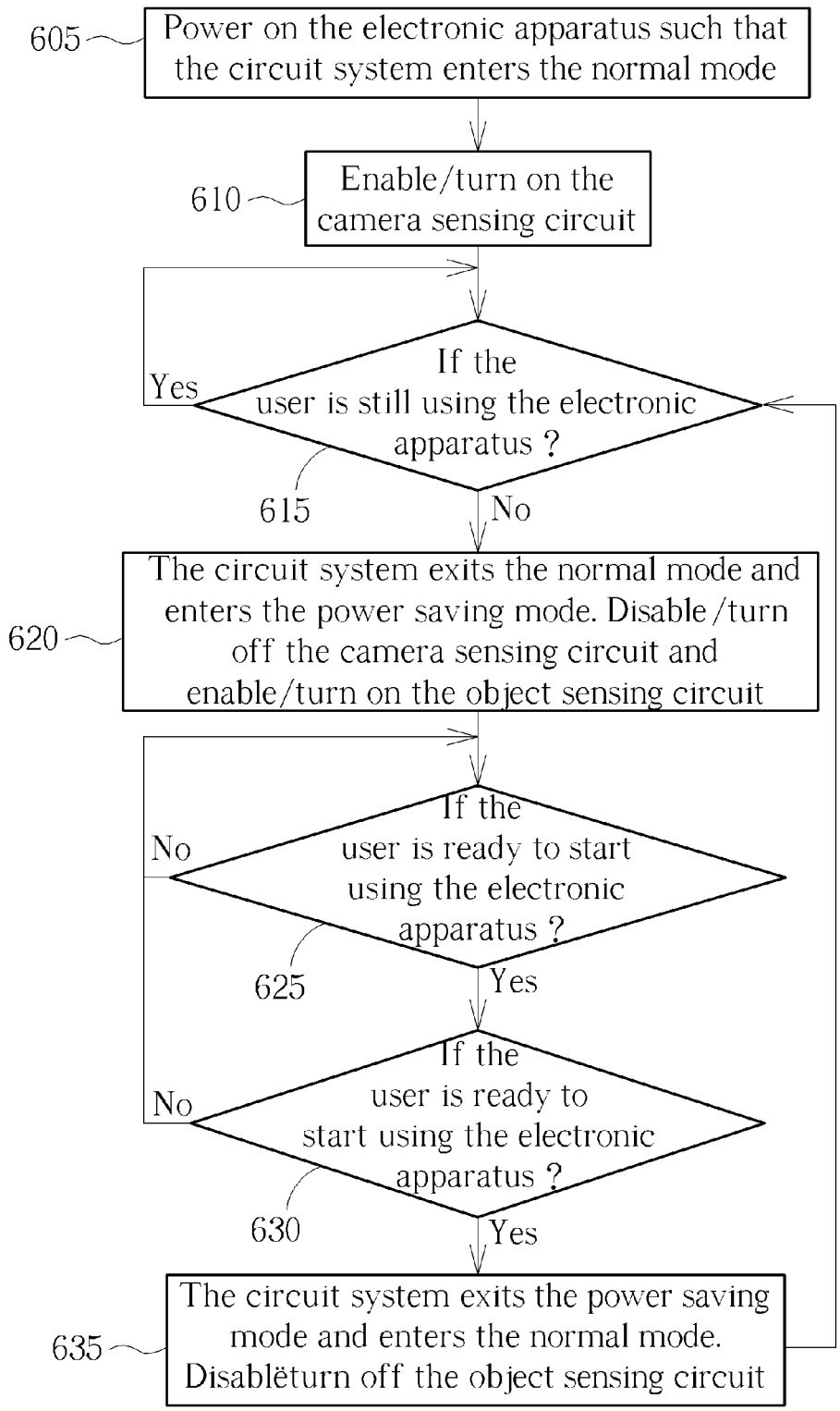
FIG. 6 is a flowchart illustrating the operation of the electronic apparatus shown in FIG. 1 in an embodiment of the present invention.

To more clearly illustrate the concept of the present invention and the operation mode switching operation of the present invention, please refer to FIG. 5 and FIG. 6, which are flowcharts illustrating the operations of the electronic apparatus 100 shown in FIG. 1 in different embodiments of the present invention. Provided that substantially the same result is achieved, the steps of the flowcharts shown in FIG. 5 and FIG. 6 need not be in the exact order shown and need not be contiguous, that is, other steps can be intermediate. The flowcharts are described as below:

Step 505: Power on the electronic apparatus 100 such that the circuit system 105 enters the normal mode;

Step 510: Enable/turn on the camera sensing circuit 110 such that the camera sensing circuit 110 operates in the normal mode;

Step 515: Use the camera sensing circuit 110 to sense existence of at least a portion of a portrait of a user to determine whether the user is still using the electronic apparatus 100. If yes, repeat step 515; otherwise, go to step 520;

Step 520: The circuit system 105 exits the normal mode and enters the power saving mode. Disable/turn off the camera sensing circuit 110 (i.e., make the camera sensing circuit 110 operate in the power saving mode), and enable/turn on the object sensing circuit 115;

Step 525: Use the object sensing circuit 115 to sense the distance of an interference object to determine if the user is ready to start using the electronic apparatus 100. If yes, go to step 530; otherwise, repeat step 525; and Step 530: The circuit system 105 exits the power saving mode and enters the normal mode. Disable/turn off the object sensing circuit 115.

Step 605: Power on the electronic apparatus 100 such that the circuit system 105 enters the normal mode;

Step 610: Enable/turn on the camera sensing circuit 110 such that the camera sensing circuit 110 operates in the normal mode;

Step 615: Use the camera sensing circuit 110 to sense existence of at least a portion of a portrait of a user to determine whether the user is still using the electronic apparatus 100. If yes, repeat step 615; otherwise, go to step 620;

Step 620: The circuit system 105 exits the normal mode and enters the power saving mode. Disable/turn off the camera sensing circuit 110 (i.e., make the camera sensing circuit 110 operate in the power saving mode), and enable/turn on the object sensing circuit 115;

Step 625: Use the object sensing circuit 115 to sense the distance of an interference object to determine if the user is ready to start using the electronic apparatus 100. If yes, go to step 630; otherwise, repeat step 625;

Step 630: Enable/turn on the camera sensing circuit 110 to sense existence of at least a portion of a portrait of a user to determine whether the user is ready to start using the electronic apparatus 100 or not. If yes, go to step 635; otherwise, disable/turn off the camera sensing circuit 110 and go to step 625; and Step 635: The circuit system 105 exits the power saving mode and enters the normal mode. Disable/turn off the object sensing circuit 115.

Moreover, the above-mentioned object sensing circuit 115 may be implemented by a proximity sensor or a distance measure system (DMS). In other embodiment of the present invention, the object sensing circuit 115 may be implemented by an ambient light sensor (ALS). In this embodiment, the object sensing circuit 115 is used to sense the ambient light to determine if a distance between the object and the electronic apparatus 100 is changed. When a distance between the object and the electronic apparatus 100 is changed (i.e., a user may start to use the electronic apparatus 100), the object sensing circuit 115 would notify the camera sensing circuit 110 and the circuit system 105 to make the camera sensing circuit 110 and the circuit system 105 exit the power saving mode and enter the normal mode. When the ambient light changes dramatically, this means that there may be a user approaching the electronic apparatus 100 such that part of the light is obscured by the user and the intensity of the ambient light decreases correspondingly. Therefore, if the recorded ambient light values are substantially different from each other or are smaller due to the dramatic change, the object sensing circuit 115 determines that a user (i.e., a new object) moves to the vicinity of the electronic apparatus 100 and prepares to start to use or control the electronic apparatus 100. In addition, the object sensing circuit 115 which employs an ambient light sensor may also collaborate with a camera sensing circuit 110 to determine whether a user is ready to start using the electronic apparatus 100, thus further improving the determination accuracy.

Besides, the USB shown in the embodiment of FIG. 4 could be replaced by other signal input/output (I/O) interfaces such as a Peripheral Component Interconnect (PCI) bus interface. In addition, the object sensing circuit 115 maybe implemented by a proximity sensor or a distance measure system (DMS). And the object sensing circuit 115 is not limited to determining whether a user is approaching the electronic apparatus 100 and is ready to start using the electronic apparatus 100 by only comparing the distance value of the interference object previously recorded at the time the circuit system 105 enters the power saving mode and the distance value of the interference object currently recorded at the time the circuit system 105 is still in the power saving mode. In other embodiments, the object sensing circuit 115 may compute a distance difference between the distance value of the interference object previously recorded at the time the circuit system 105 enters the power saving mode and the distance value of the interference object currently recorded at the time the circuit system 105 is still in the power saving mode, and then compare the distance difference with a predetermined threshold to determine whether a user approaches the electronic apparatus 100 and is ready to start using the electronic apparatus 100. If the distance difference is smaller than the predetermined threshold, the object sensing circuit 115 regards the distance difference as an error value resulting from sensing the distance of the interference object, and determines that there is no object movement. Thus, the object sensing circuit 115 determines that the user does not move to the vicinity of the electronic apparatus 100, and does not start to use or control the electronic apparatus 100. However, if the distance difference is larger than or equal to the predetermined threshold, the object sensing circuit 115 would not regard the distance difference as an error value, and thus determines that the user is approaching the electronic apparatus 100 or starting to use or control the electronic apparatus 100. Other alternative designs based on above embodiment all fall within the scope of the present invention.

Figure 7:
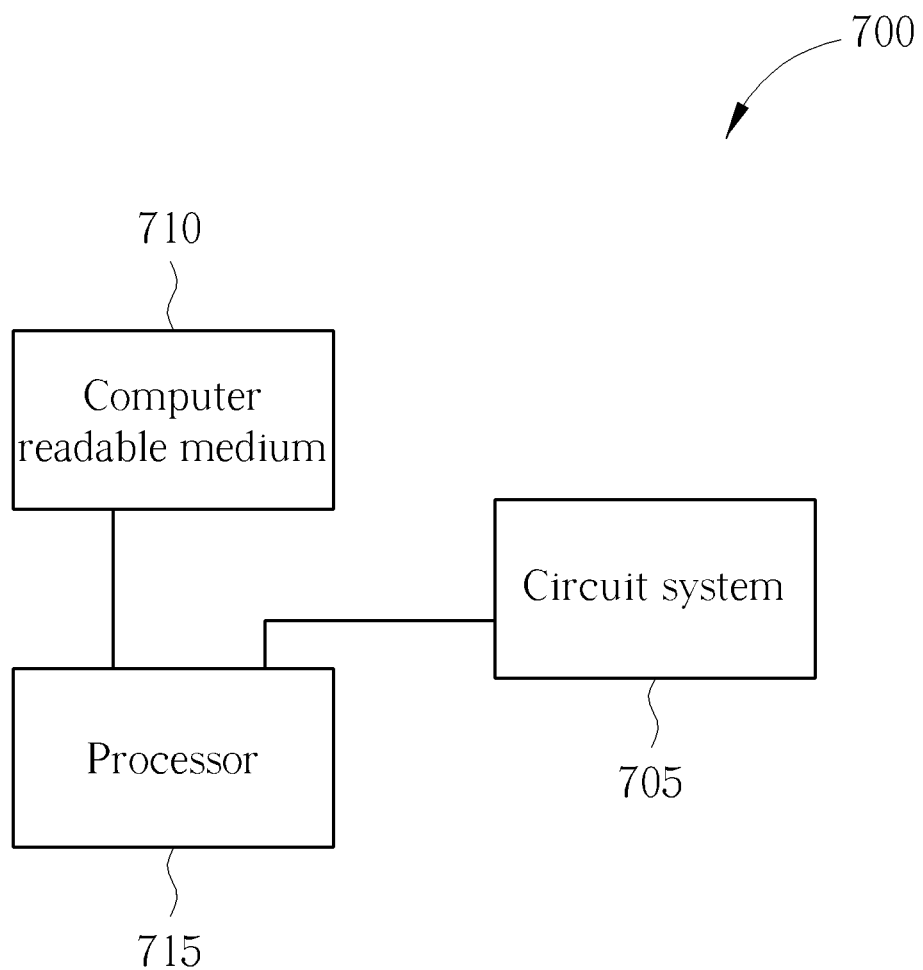
FIG. 7 is a diagram illustrating a simplified electronic apparatus according to an embodiment of the present invention.

Furthermore, the above-mentioned switching between different operation modes according to two different sensing techniques may also be implemented by software such as a program code. Please refer to FIG. 7, which is a diagram illustrating a simplified electronic apparatus 700 according to an embodiment of the present invention. The electronic apparatus 700 includes a circuit system 705, a computer-readable medium 710 and a processor 715, wherein the processor 715 is used to control the operation of the circuit system 705. By way of example, but not limitation, the computer-readable medium 710 may be coupled to the circuit system 705 through the processor 715 or may be directly connected to the circuit system 705. The computer-readable medium 710 stores at least a program code, and the processor 715 is used to read the program code and execute the following step according to the program code: using an image sensing technique to sense at least a portion of a portrait of a user to determine if the circuit system 705 should enter a power saving mode from a normal mode; and using an object sensing technique to sense object(s) around the electronic apparatus 700 to determine if the circuit system 705 should enter the normal mode from the power saving mode, wherein the object sensing technique is different from the image sensing technique. It should be noted that the circuit system 705 may be regarded as at least one circuit component included in the electronic apparatus 700 besides the processor 715, and the computer-readable medium 710 may be implemented by a storage component, such as a memory, an optical disc, a hard disk or a flash memory. Moreover, the computer-readable medium 710 could also be externally connected to the electronic apparatus 700 instead of being disposed inside the electronic apparatus 700.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus, comprising:
    a circuit system, arranged for controlling an operation of the electronic apparatus;
    a camera sensing circuit, coupled to the circuit system, the camera sensing circuit arranged for sensing at least a portion of a portrait of a user; and
    an object sensing circuit, coupled to the circuit system, the object sensing circuit arranged for sensing object(s) around the electronic apparatus, wherein an operation of the object sensing circuit is different from an operation of the camera sensing circuit;
    wherein the camera sensing circuit is used for determining whether to notify the circuit system to switch from a first operation mode to a second operation mode, and the object sensing circuit is used for determining whether to notify the circuit system to switch from the second operation mode to the first operation mode; the camera sensing circuit is coupled between the circuit system and the object sensing circuit; when the object sensing circuit determines that a distance between the object and the electronic apparatus is changed by sensing an object distance, the object sensing circuit notifies the circuit system through the camera sensing circuit for switching the circuit system from the second operation mode to the first operation mode.

2. The electronic apparatus of claim 1, wherein the first operation mode is a normal mode, and the second operation mode is a power saving mode.

3. The electronic apparatus of claim 2, wherein when the camera sensing circuit detects no portrait of the user or determines that the user is not operating the electronic apparatus, the camera sensing circuit notifies the circuit system for switching the circuit system into the power saving mode.

4. The electronic apparatus of claim 2, wherein when the circuit system enters the power saving mode, the circuit system is configured to control the camera sensing circuit to enter the power saving mode from the normal mode.

5. The electronic apparatus of claim 4, wherein when the object sensing circuit determines that a distance between the object and the electronic apparatus is changed, the object sensing circuit notifies the camera sensing circuit and the circuit system for making the camera sensing circuit and the circuit system switch from the power saving mode to the normal mode.

6. The electronic apparatus of claim 5, wherein the object sensing circuit is a proximity sensor or a distance measure system.

7. The electronic apparatus of claim 4, wherein when the object sensing circuit determines that a distance between the object and the electronic apparatus is changed by sensing ambient light, the object sensing circuit notifies the camera sensing circuit and the circuit system for switching the camera sensing circuit and the circuit system from the power saving mode to the normal mode.

8. The electronic apparatus of claim 7, wherein the object sensing circuit is an ambient light sensor.

9. The electronic apparatus of claim 1, wherein when the object sensing circuit is operating in the second operation mode and determines that the distance between the object and the electronic apparatus is changed, the object sensing circuit notifies the camera sensing circuit to switch from the second operation mode to the first operation mode for performing a portrait determination.

10. The electronic apparatus of claim 9, wherein when the camera sensing circuit determines that the object change is related to the portrait, the camera sensing circuit notifies the circuit system to switch from the second operation mode to the first operation mode.

11. The electronic apparatus of claim 9, wherein when the camera sensing circuit determines that the object change is not related to the portrait, the camera sensing circuit enters the second operation mode without notifying the circuit system of a result of the portrait determination, and the circuit system remains in the second operation mode.

12. A non-transitory computer-readable medium, coupled to an electronic apparatus having a circuit system, wherein the computer-readable medium includes at least a program code stored therein, and following steps are performed when the program code is read and executed:
    using an image sensing technique to sense at least a portion of a portrait of a user to determine whether to notify the circuit system to switch from a first operation mode to a second operation mode;
    using an object sensing technique to sense object(s) around the electronic apparatus to determine whether to notify the circuit system to switch from the second operation mode to the first operation mode; and
    when the object sensing technique determines that a distance between the object and the electronic apparatus is changed by sensing an object distance, using the object sensing technique to notify the circuit system through the image sensing technique for switching the circuit system from the second operation mode to the first operation mode;
    wherein the object sensing technique is different from the image sensing technique.

13. The computer-readable medium of claim 12 wherein the first operation mode is a normal mode, and the second operation mode is a power saving mode.

14. The computer-readable medium of claim 13 wherein the step of determining whether to notify the circuit system to exit the first operation mode and enter the second operation mode comprises:
    when the image sensing technique detects no portrait of the user or determines that the user is not operating the electronic apparatus, notifying the circuit system to enter the power saving mode.

15. The computer-readable medium of claim 14 wherein the step of determining whether to notify the circuit system to switch from the second operation mode to the first operation mode comprises:
    when the object sensing technique determines that the distance between the object and the electronic apparatus is changed by sensing the object distance, notifying the circuit system to exit the power saving mode and enter the normal mode.

16. The computer-readable medium of claim 14 wherein the step of determining whether to notify the circuit system to switch from the second operation mode to the first operation mode comprises:
    when the object sensing technique determines that the distance between the object and the electronic apparatus is changed by sensing ambient light, notifying the circuit system to exit the power saving mode and enter the normal mode.

17. The computer-readable medium of claim 12 further comprising:
    when the object sensing technique is in the second operation mode and determines that the distance between the object and the electronic apparatus is changed, enabling the image sensing technique to sense the portrait of the user for performing a portrait determination.

18. The computer-readable medium of claim 17 wherein performing the portrait determination comprises:
  when the image sensing technique determines that the object change is related to the portrait, notifying the circuit system to switch from the second operation mode to the first operation mode.

19. The computer-readable medium of claim 17, wherein performing the portrait determination comprises:
  when the image sensing technique determines that the object change is not related to the portrait, not notifying the circuit system of a result of the portrait determination, and remaining the circuit system in the second operation mode.

* * * * *